United States Patent [19]

Ishii et al.

[11] Patent Number: 4,847,805
[45] Date of Patent: Jul. 11, 1989

[54] MICROCOMPUTER DEVELOPMENT SYSTEM

[75] Inventors: Yasunori Ishii; Mamoru Yura, both of Tokyo, Japan

[73] Assignee: NEC Corporation, Tokyo, Japan

[21] Appl. No.: 892,036

[22] Filed: Aug. 1, 1986

[30] Foreign Application Priority Data

Aug. 1, 1985 [JP] Japan .................................. 60-170610

[51] Int. Cl.[4] .............................................. G06F 11/30
[52] U.S. Cl. ........................................ 364/900; 371/20
[58] Field of Search ... 364/200 MS File, 900 MS File; 371/19, 20, 23

[56] References Cited

U.S. PATENT DOCUMENTS

| 4,447,876 | 5/1984 | Moore | 364/200 |
|---|---|---|---|
| 4,486,827 | 12/1984 | Shima et al. | 364/200 |
| 4,633,417 | 12/1986 | Wilburn et al. | 364/550 |
| 4,638,423 | 1/1987 | Ballard | 364/200 |
| 4,674,089 | 6/1987 | Poret et al. | 371/25 |
| 4,691,316 | 9/1987 | Phillips | 371/20 |
| 4,727,512 | 2/1988 | Birkner et al. | 364/900 |
| 4,780,819 | 11/1988 | Kashiwagi | 364/200 |
| 4,788,683 | 11/1988 | Hester et al. | 371/20 |

Primary Examiner—Gareth D. Shaw
Assistant Examiner—Maria Napiorkowski
Attorney, Agent, or Firm—Foley & Lardner, Schwartz, Jeffery, Schwaab, Mack, Blumenthal & Evans

[57] ABSTRACT

A development system for a family of one-chip microcomputers which are all of the same architecture but differ in the memory size and the input/output number, comprises a common emulation chip having the largest memory size and the largest input/output number in the microcomputer family, an information memory storing a data memory area utilizable in a target microcomputer to be developed, a local emulation chip for emulating the peripheral hardware of the target microcomputer, and a guard controller generating a guard verify signal for stopping an emulation operation when the access is made to a memory area or a peripheral hardware which is not to be included in the target microcomputer. Thus, the access to the resources which is not to be included in the target microcomputer is inhibited.

12 Claims, 2 Drawing Sheets

MICROCOMPUTER DEVELOPMENT SYSTEM

BACKGROUND OF THE INVENTION

1. Field of the Invention

The present invention relates to a development system which can be used for developing a family of one-chip microcomputers which are all of the same architecture but differ in resources such as memory size, input/output number, etc. (the plurality of kinds of one-chip microcomputers will be called a "microcomputer family", hereinafter). More particularly, the present invention relates to a microcomputer development system having a means for inhibiting access to resources which are not to be included in a target microcomputer to be developed.

2. Description of related art

At present, a variety of computer development systems are used for development of microcomputers and other small-sized computers. In these computer development systems, a program for a target computer to be developed is stored in a memory called an "emulation memory", and the program is executed by an existing computer called an "emulation chip", so that a programmed operation is simulated. With this emulation, various bugs in the program are found if any, and then the program is debugged for each emulation.

However, target microcomputers to be developed are not necessarily the same in resources such as memory area, input/output terminal number, etc. Therefore, an emulation chip capable of being used in common with various target microcomputers, is of necessity adapted to comply with the maximum possible microcomputers resource requirement. As a result, the emulation chip frequently emulates an operation requiring an improper resource which is not to be included in a target microcomputer under development. In such a case, if the program completely debugged as a result of the above emulation is applied to an actual target microcomputer, it will not operate properly, because it cannot execute the operation requiring the resource not included in the actual target microcomputer.

SUMMARY OF THE INVENTION

Accordingly, it is an object of the present invention to provide a microcomputer development system resolving the inconvenience mentioned above.

Another object of the invention is to provide a microcomputer development system comprising a means for inhibiting access to resources which are not to be included in a target microcomputer under development.

Still another object of the present invention is to provide a computer development system in which there is inhibited access to a memory area which is not to be included in a target computer under development.

A further object of the present invention is to provide a computer development system in which there is inhibited access through an input/output terminal which is not to be included in a target microcomputer under development.

The above and other objects of the present are achieved in accordance with one aspect of the present invention by a microcomputer development system for a family of microcomputers having the same architecture but differing in resource, comprising an emulator memory storing a program for a target microcomputer, which program is emulated; an emulation chip executing emulation of the program stored in the emulation memory in an emulation mode; a supervisor controlling the emulation chip in a supervisor mode and allowing the emulation chip to emulate the program in an emulation mode; a break controller generating the sending of an emulation stop signal to the emulation chip when input/output signals of the emulation chip satisfy a condition set by the supervisor; and a guard controller causing the break controller to generate the emulation stop signal when there is requested an access to a resource which is not to be included in the target microcomputer.

In a preferred embodiment, the microcomputer development system further includes an information memory storing the information concerning the specific resources (limited with respect to the larger resources of the common emulation chip 4) of the target microcomputer to be emulated, and the guard controller compares the limited resources of the target microcomputer with the resource requested by the emulation chip.

Specifically, the information memory stores the information of a memory area available in the target microcomputer, and the guard controller examines on the basis of the information stored in the memory whether or not the emulation chip requests an access to a memory area which is not to be included in the available memory area of the target microcomputer.

In this case, the emulation chip can be assembled on a common emulation board, and the information memory can be assembled on a local emulation board independently of the common emulation board and disconnectably coupled to the common emulation board.

Furthermore, the microcomputer development system includes a local emulation chip provided independently of the first named emulation chip for emulating a peripheral hardware portion of the target microcomputer, and the break controller operates to generate the emulation stop signal to the first named emulation chip and the local emulation chip when the input/output signals of the local emulation chip satisfy the predetermined condition set by the supervisor.

In this case, the emulation chip can be assembled on a common emulation board, and the information memory and the local emulation chip can be assembled on a local emulation board independently of the common emulation board and disconnectably coupled to the common emulation board.

According to another aspect of the present invention, there is provided a microcomputer development system which can be used in common with a family of one-chip microcomputers which are all of the same architecture but differ at least in memory size and in the number of input/output connections, comprising a common emulation chip having the largest memory size and the largest input/output number among the one-chip microcomputers, an emulation memory containing user's programs for a target microcomputer and accessible by the common emulation chip in the emulation mode, a supervisor controlling the common emulation chip in a supervisor mode and allowing the common emulation chip to execute an emulation of the user programs in an emulation mode, a control program memory accessible by the supervisor and by the common emulation chip in the supervisor mode, a mode selector connecting the common emulation chip to the program memory in the supervisor mode and to the emulation memory in the emulation node, a mode selector controller controlled by the supervisor to generate and send a mode select signal to the mode selector so as to put it either in the supervisor mode or the emulation mode, a break controller checking the input/output signals of the common emulation chip for outputting an emulation stop signal to the emulation chip when given conditions are satisfied, an information memory storing a data memory area characterizing the target microcomputer, and a guard controller responsive to the data memory area in the information memory for outputting a guard verify signal to the break controller so as to cause it to generate the emulation stop signal when the common emulation chip accesses a memory area that is not to be included in the target microcomputer.

Preferably, the microcomputer development system further includes a local emulation chip for emulating the peripheral hardware of the target microcomputer, and the guard controller operates to generate and send the guard verify signal to the break controller when the local emulation chip accesses a peripheral hardware which is not to be included in the target microcomputer.

In this case, the information memory and the guard controller are controlled by the supervisor so that the memory area information of the information memory is copied by the guard controller. Further, when the guard verify signal is outputted from the guard controller or when the predetermined conditions set by the supervisor are satisfied, the emulation stop signal is generated and sent from the break controller to the common emulation chip, the local emulation chip and the mode selector controller, so that the system is forcedly put in the supervisor mode.

The above and other objects, features and advantages of the present invention will be apparent from the following description of a preferred embodiment of the invention with reference to the accompanying drawings.

PREFERRED EMBODIMENT OF THE INVENTION

Figure 1:
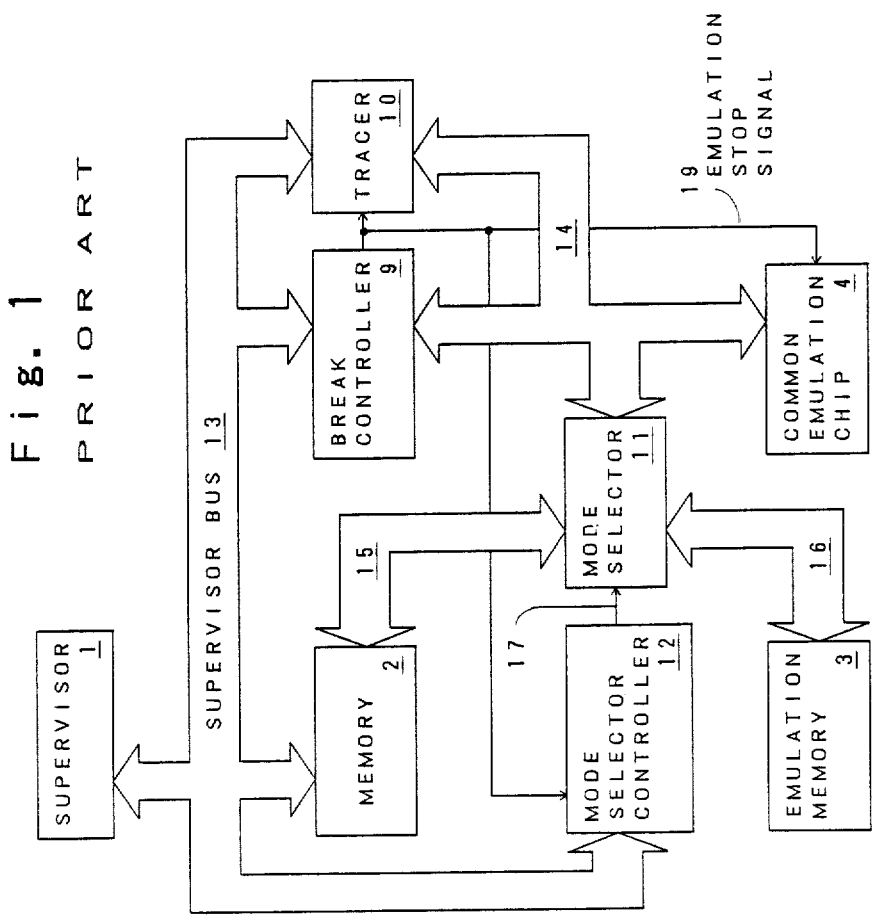
FIG. 1 is a block diagram showing an embodiment of a microcomputer development system according to the prior art.

Referring to FIG. 1, there is shown a block diagram of one typical example of the conventional development system for a one-chip microcomputer family.

The microcomputer development system comprises a common emulation chip 4, which is the largest scale microcomputer in the family, that is, has the largest memory capacity and the largest input/output number in the family, so that the common emulation chip 4 can be used for emulation of any one-chip microcomputers in a family.

The microcomputer development system further comprises a supervisor 1 provided with a work memory and a monitor memory (not shown). The supervisor 1 supervises the whole operation of the microcomputer development system and, in particular, selectively puts the system either in a supervisor mode or in an emulation mode. Specifically, the supervisor 1 controls the common emulation chip 4 through a control program memory 2 in the supervisor mode. Further it sets a break condition to a break controller 9 and a trace condition to a tracer 10.

Specifically, the memory 2 stores a control program which is used when the supervisor 1 accesses the common emulation chip 4 and when the common emulation chip 4 also accesses the supervisor 1. Therefore, the memory 2 is accessible from the supervisor 1 via a supervisor bus 13, and from the common emulation chip 4 via an emulation chip bus 14 and a control program memory access bus 15. The supervisor bus 13 includes a supervisor address bus, a supervisor data bus and a supervisor control bus. Similarly, the emulation chip bus 14 contains an emulation chip address bus, an emulation chip data bus and an emulation chip control bus.

In the emulation mode, the common emulation chip 4 accesses an emulation memory 3 through a mode selector 11 and an emulation memory access bus 16. In the emulation memory 3, a user's program to be emulated is stored. The mode selector 11 is controlled by a mode selector controller 12, which generates a mode selection signal 17 in response to a signal from the supervisor 1 via the supervisor bus 13. Depending on the mode select signal 17, the mode selector 11 selectively interconnects different buses: when the signal 17 indicates the supervisor mode, the control program memory access bus 15 is connected to the emulation chip bus 14; and when the signal 17 indicates the emulation mode, the emulation chip bus 14 is connected through the emulation memory access bus 16 to the emulation memory 3.

The microcomputer development system further comprises a break controller 9, which checks the input/output signals of the common emulation chip 4 via the emulation chip bus 14. When the break controller 9 detects that such signals satisfy a predetermined break condition which is set by the supervisor 1 via the supervisor bus 13, the break controller 9 outputs an emulation stop signal 19 to a tracer 10 and to the common emulation chip 4 to stop the emulation operation. The emulation stop signal 19 is also outputted to the mode selector controller 12 to forcedly switch the system from the emulation mode to the supervisor mode.

In the following, an emulation operation of the microcomputer development system as shown in FIG. 1 is explained in detail.

First of all, the supervisor 1 sets break conditions and trace conditions in the break controller 9 and in the tracer 10 respectively via the supervisor bus 13. Then, a signal designating the supervisor mode is outputted to the supervisor bus 13 from the supervisor 1. Receiving the signal through the supervisor bus 13, the mode selector controller 12 outputs the mode select signal 17 to the mode selector 11 so as to put the microcomputer development system in the supervisor mode. In the supervisor mode, both the supervisor 1 and the common emulation chip 4 access the control program memory 2. The supervisor 1 accesses the memory 2 via the supervisor bus 13; on the other hand, the common emulation chip 4 accesses the memory 2 via the control program memory access bus 15 and the emulation chip bus 14.

If a mode change signal is outputted to the supervisor bus 13, the signal is received by the mode selector controller 12. Consequently, the mode selector controller 12 outputs a mode select signal 17 to put the microcomputer development system in the emulation mode. In the emulation mode, the emulation memory access bus 16 and the emulation chip bus 14 are connected. As a result, the common emulation chip 4 accesses the emulation memory 3 via the interconnected buses 14 and 16 and then emulation operation begins according to the programs in the emulation memory 3.

In the emulation operation, for example, when the input/output signals of the common emulation chip 4 satisfy a predetermined condition set by the supervisor 1, the break controller 9, checking the signals via the emulation chip bus 14, outputs an emulation stop signal 19 to the tracer 10 and to the common emulation chip 4 so as to stop the emulation operation. At the same time, the emulation stop signal 19 is sent to the mode selector controller 12. The mode selector controller 12 then outputs the mode select signal 17 to put the microcomputer development system in the supervisor mode. In the supervisor mode, the common emulation chip 4 accesses again the memory 2 via the control program memory access bus 15 and the emulation chip bus 14.

With the above mentioned development system for a one-chip microcomputer family, an emulation operation is performed by the common emulation chip 4 which has the largest memory size and the largest input/output terminal number in the family. As a result, there are emulated not only a memory area which exists in the common emulation chip 4 but is not even provided in the target microcomputer to be developed (referred to as an "improper memory area" hereinafter), but also an improper peripheral hardware which is not included in the target microcomputer. But, when the emulation operation is performed by using the improper memory area or peripheral hardware, it is not necessarily recognized as being an error. This is disadvantageous in that a program which has already been debugged by the above-mentioned development system for a one-chip microcomputer family may not properly work on an actual target microcomputer.

Figure 2:
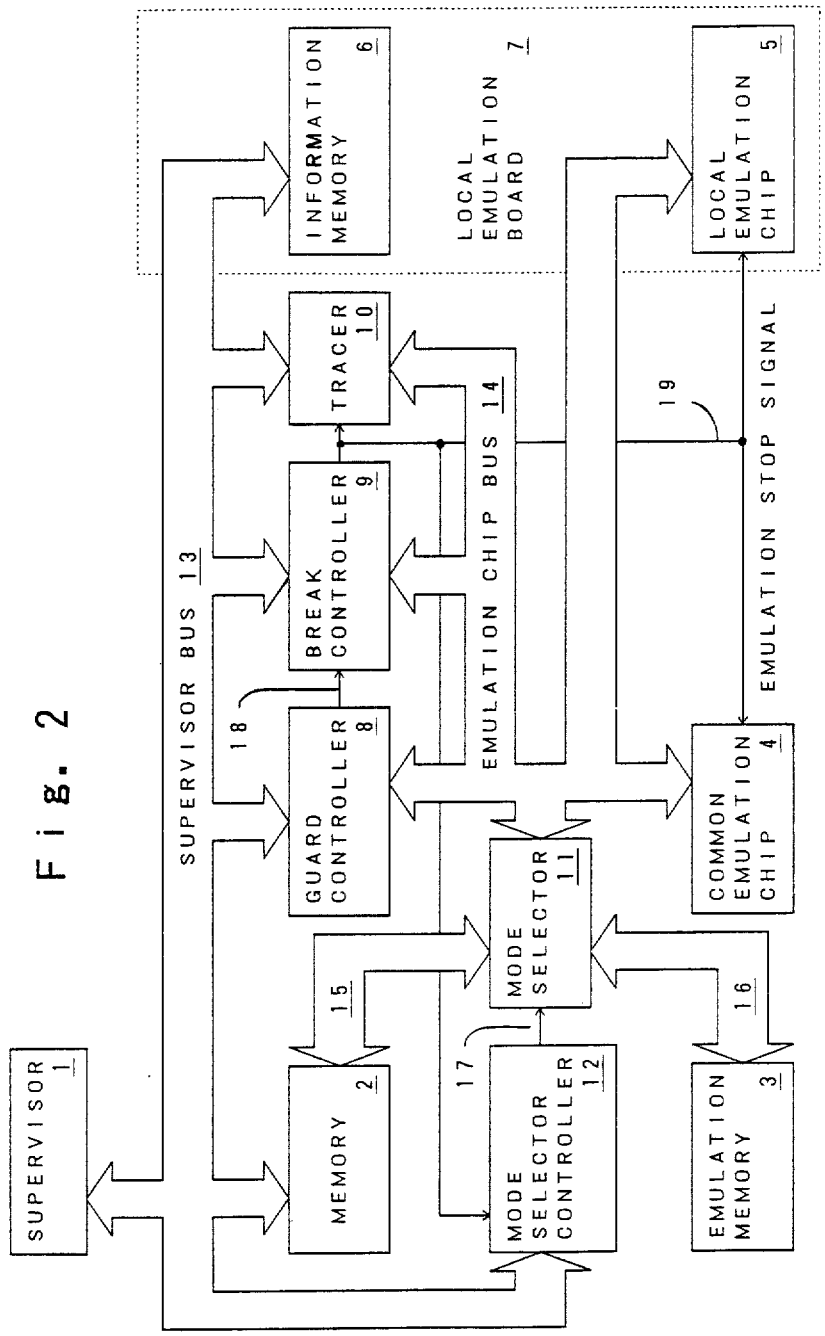
FIG. 2 is a block diagram showing an embodiment of a microcomputer development system according to the present invention.

Turning to FIG. 2, there is shown a block diagram of an embodiment of a development system for a one-chip microcomputer family according to the present invention. In FIG. 2, elements similar to those of the system shown in FIG. 1 are given the same reference numerals, and explanation will be omitted for simplification of description.

The microcomputer development system is composed of two boards: a common emulation chip board including at least a common emulation chip 4; and a local emulation board 7 comprising a local emulation chip 5 and an information memory 6. The local emulation board can be replaced for each emulation and is easily connectable to the common board. At the connection between the two boards by means of board connectors, the memory 6 is connected to a supervisor bus 13 and the the local emulation chip 5 is connected to an emulation chip bus 14 and an emulation stop signal line 19.

The common emulation chip 4 is used for emulation of all one-chip microcomputers in a family. Therefore, the common emulation chip 4 is the largest scale emulation chip, that is, the common emulation chip 4 has the largest memory size and the largest input/output number in the family.

In contrast to the common emulation chip 4, the local emulation chip 5 emulates an unique area of a target microcomputer to be developed such as a peripheral hardware. On the other hand, the information memory 6 stores the data memory area utilizable in the target microcomputer to be developed. The memory size of the information memory 6 is of course smaller than that of the common emulation chip 4.

The common emulation chip board comprises also a supervisor 1 having a work memory and a monitor memory (not shown in FIG. 1 just as in FIG. 2). The supervisor 1 supervises the whole operation of the microcomputer development system. More particularly, the supervisor 1 has the function similar to the system of FIG. 1 but has an additional function of copying a data memory area information stored in the information memory 6 to a guard controller 8 at initialization. The copy operation is performed via a supervisor bus 13.

The guard controller 8 compares the memory access request from the common emulation chip 4 with the available memory area information which has been copied from the information memory 6. When the common emulation chip 4 requests to access a memory area which is not included in the available memory area information, the guard controller 8 generates a guard verify signal 18 to the break controller 9.

In addition to checking of the guard verify signal 18, the break controller 9 checks the input/output signals of the common emulation chip 4 and the local emulation chip 5 via the emulation chip bus 14. When the guard verify signal 18 is detected, or when the break controller 9 detects that the input/output signals satisfy the predetermined break condition set by the supervisor 1, the break controller 9 outputs an emulation stop signal 19 to the tracer 10 and to the common emulation chip 4 to stop the emulation operation. The tracer 10 is for tracing signals relating to the common emulation chip 4 under predetermined conditions determined by the supervisor 1. The emulation stop signal 19 is also outputted to the mode selector controller 12 to switch the system from the emulation mode to the supervisor mode.

In the following, the emulation operation of the microcomputer development system as shown in FIG. 2 is explained in detail.

First of all, the local emulation board 7 including the local emulation chip 5 and the information memory 6 is connected to the common emulation chip board comprising the common emulation chip 4 and the guard controller 8. At the initialization, the supervisor 1 controls the guard controller so that it copies the information of a data memory area utilizable or available in a target microcomputer to be developed. In addition, the supervisor 1 sets break conditions and trace conditions in the break controller 9 and in the tracer 10 respectively via the supervisor bus 13. Then, a signal designating the supervisor mode is outputted to the supervisor bus 13 from the supervisor 1. In response to the signal through the supervisor bus 13, the mode selector controller 12 outputs a mode select signal 17 to the mode selector 11 to put the development system in the supervisor mode. In the supervisor mode, both the supervisor 1 and the common emulation chip 4 access the control program memory 2. The supervisor 1 accesses the memory 2 via the supervisor bus 13; and on the other hand, the common emulation chip 4 accesses the memory 2 via the control program memory access bus 15 and the emulation chip bus 14.

If a signal which puts the microcomputer development system from the supervisor mode to the emulation mode is then outputted to the supervisor bus 13, the signal is received by the mode selector controller 12. Consequently, the mode selector controller 12 outputs a mode select signal 17 to put the microcomputer development system in the emulation mode. In the emulation mode, the emulation memory access bus 16 and the emulation chip bus 14 are connected. As a result, the common emulation chip 4 and the local emulation chip 5 access the emulation memory 3 via the interconnected buses 14 and 16 and then emulation operation begins according to the programs in the emulation memory 3.

Switching from the emulation mode to the supervisor mode takes place in either of the following two cases.

The first case is as follows. When the input/output signals of the common emulation chip 4 or the input/output signals of the local emulation chip 5 satisfy the predetermined conditions set by the supervisor 1, the break controller 9, checking the signals via the emulation chip bus 14, outputs the emulation stop signal 19 to the tracer 10, to the common emulation chip 4 and to the local emulation chip 5 so that the emulation operation is stopped. At the same time, the emulation stop signal 19 is sent to the mode selector controller 12.

The second case is as follows. The guard controller 8 compares its stored available memory area information with a memory area to which access is required by the common emulation chip 4. In this comparison, when it is judged that the common emulation chip 4 tends to access a memory area that is not included in the stored available memory area, a guard verify signal 18 is outputted from the guard controller 8 to the break controller 9. Then, operation continues the same as described above for the first case. The break controller 9 outputs an emulation stop signal 19 to the tracer 10, to the common emulation chip 4 and to the local emulation chip 5 to stop the emulation operation. At the same time, the emulation stop signal 19 is sent to the mode selector controller 12.

The mode selector controller 12 then outputs a mode select signal 17 to put the microcomputer development system in the supervisor mode. In the supervisor mode, the common emulation chip 4 accesses again the memory 2 via the control program memory access bus 15 and the emulation chip bus 14.

As explained above, the microcomputer development system according to the present invention is composed of two boards: an exchangeable and connectable board including a local emulation chip and an information memory in which different kinds of requirements unique to respective target microcomputers to be developed are stored; and a common emulation chip board comprising a guard controller and a common emulation chip. Owing to the function of the guard controller, the microcomputer development system is capabale of stopping emulation operation when there is requested an access to an improper memory area or an improper peripheral hardware that does not exist in a target microcomputer to be developed. In addition, the microcomputer development system has an advantage that when another microcomputer is to be debugged, it is sufficient if only the local emulation chip board is exchanged to the common emulation chip board.

By further writing the information memory with the information unique to the microcomputer to be developed such as read/write signals and valid access information, the development system for the one-chip microcomputer becomes further close to an equivalent of the microcomputer to be developed.

The invention so far has been shown and described with reference to a specific embodiment. However, the invention is in no way limited to the details of the illustrated structures but changes and modifications may be made within the scope of the invention.

We claim:

1. A microcomputer development system for a family of microcomputers having a same architecture but differing in resources, the system comprising:
    an emulation memory storing a program for a target microcomputer, said program to be emulated;
    an emulation chip, coupled to the emulation memory in an emulation mode, for executing emulation of the program stored in the emulation memory in an emulation mode;
    an information memory for storing information indicating a resource which can be used by the target microcomputer;
    a guard controller, connected to said information memory, for copying a content of the information memory in a supervisor mode before the emulation chip starts to execute the program, stored in the emulation memory, in the emulation mode, the guard controller, in the emulation mode, comparing information written in the guard controller with address information from the emulation chip so as to generate and send a guard verify signal when the address information indicates access to a resource which cannot be used by the target microcomputer;
    a break controller responsive to the guard verify signal to generate and send an emulation stop signal to the emulation chip; and
    a supervisor means for controlling the entire system, the supervisor means controlling the guard controller so that the content of the information memory is copied to the guard controller in the supervisor mode before the emulation chip starts to execute the program, stored in the emulation memory, in the emulation mode, the supervisor means selectively either controlling the emulation chip in the supervisor mode or allowing the emulation chip to emulate said program in the emulation mode in such a manner that when the emulation chip emulates said program, stored in the emulation memory, in an emulation mode, if said emulation stop signal is generated, the emulation chip is put into the supervisor mode.

2. A microcomputer development system as claimed in claim 1 wherein the emulation chip is assembled on a common emulation board, and the information memory is assembled on a local emulation board distinct from the common emulation board and releasably coupled to the common emulation board.

3. A microcomputer development system as claimed in claim 1 further including a local emulation chip provided independently of the emulation chip, said local emulation chip, coupled to the emulation memory in the emulation mode, for emulating a peripheral hardware portion of the target microcomputer, the break controller operating to generate and send the emulation stop signal to the emulation chip and to the local emulation chip when at least one of input/output signals of the local emulation chip satisfies a condition set by the supervisor means; said input/output signals of the local emulation chip including a signal from the emulation memory to said local emulation chip and a signal generated from said local emulation chip in the course of the emulation.

4. A microcomputer development system as claimed in claim 3 wherein the emulation chip is assembled on a common emulation board, and the information memory and the local emulation chip are assembled on a local emulation board distinct from the common emulation board and releasably coupled to the common emulation board.

5. A microcomputer development system for a family of one-chip microcomputers which are all of a same architecture but differ at least in memory size and in a number of input/output connections, the system comprising:

a common emulation chip having a largest memory size and a largest input/output number from among all of the one-chip microcomputers of said family, an emulation memory containing a user's program for a target microcomputer, the emulation memory being accessible by the common emulation chip in an emulation mode, a supervisor means for controlling the entire system, a control program memory accessible by the supervisor means and by the common emulation chip in a supervisor mode, a mode selector connecting the common emulation chip to the control program memory in the supervisor mode and to the emulation memory in the emulation mode, a mode selector controller controlled by the supervisor means to generate and send a mode select signal to the mode selector so as to put it either in the supervisor mode or the emulation mode, an information memory for storing information indicating resources which can be used by the target microcomputer, a guard controller, connected to said information memory, for copying a content of the information memory in the supervisor mode before the common emulation chip starts to execute the user's program, stored in the emulation memory, in the emulation mode, the guard controller, in the emulation mode, comparing information written in the guard controller with address information from the common emulation chip so as to generate and send a guard verify signal when the address information indicates access to a resource which cannot be used by the target microcomputer, and a break controller, responsive to the guard verify signal, to generate and send an emulation stop signal to the common emulation chip; and wherein the supervisor means controls the guard controller such that the content of the information memory is copied to the guard controller in the supervisor mode before the common emulation chip starts to execute the user's program, stored in the emulation memory, in the emulation mode, the supervisor means selectively either controlling the common emulation chip in the supervisor mode or allowing the common emulation chip to emulate said user's program in the emulation mode in such a manner that when the common emulation chip emulates said user's program, stored in the emulation memory, in an emulation mode, the common emulation chip is put into the supervisor mode if said emulation stop signal is generated.

6. A microcomputer development system as claimed in claim 5 further including a local emulation chip for emulating peripheral hardware of the target microcomputer, the guard controller operating to generate and send the guard verify signal to the break controller when the local emulation chip accesses a peripheral hardware which is not to be included in the target microcomputer.

7. A microcomputer development system as claimed in claim 6, wherein the local emulation chip and the information memory are on a first board which is distinct from a second board, said second board including at least the common emulation chip.

8. A microcomputer development system as claimed in claim 7, wherein the first board is releasably connectable to the second board.

9. A microcomputer development system as claimed in claim 8, wherein the information memory and the guard controller are controlled by the supervisor means so that a memory area information of the information memory is copied by the guard controller.

10. A microcomputer development system as claimed in claim 6, wherein the common emulation chip and the local emulation chip access the emulation memory through the mode selector in the emulation mode.

11. A microcomputer development system as claimed in claim 6, wherein the emulation stop signal is outputted to the common emulation chip, the local emulation chip and the mode selector controller, so that the system is put in the supervisor mode.

12. A microcomputer development system as claimed in claim 5, wherein the break controller generates the emulation stop signal when the guard verify signal is outputted from the guard controller or when predetermined conditions set by the supervisor means are satisfied.

* * * * *